United States Patent
O'Donnell et al.

(10) Patent No.: US 7,460,699 B2
(45) Date of Patent: Dec. 2, 2008

(54) SYSTEM AND METHOD FOR A SEMI-AUTOMATIC QUANTIFICATION OF DELAYED ENCHANCEMENT IMAGES

(75) Inventors: Thomas O'Donnell, New York, NY (US); Engin DiKici, Lawrenceville, NJ (US); Randolph M. Setser, Shaker Heights, OH (US); Richard D. White, Chagrin Falls, OH (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 696 days.

(21) Appl. No.: 11/070,349

(22) Filed: Mar. 2, 2005

(65) Prior Publication Data
US 2005/0196027 A1    Sep. 8, 2005

Related U.S. Application Data

(60) Provisional application No. 60/550,874, filed on Mar. 5, 2004.

(51) Int. Cl.
*G06K 9/00* (2006.01)
(52) U.S. Cl. .................... 382/128; 382/173; 378/23
(58) Field of Classification Search ................ 382/128, 382/129, 130, 131, 132, 133, 168, 171, 181, 382/216, 201–203, 219, 232, 256, 274, 276–277, 382/282, 286–294; 600/420, 419; 378/50, 378/20, 21, 23
See application file for complete search history.

(56) References Cited

U.S. PATENT DOCUMENTS

| | | | |
|---|---|---|---|
| 6,549,798 B2 * | 4/2003 | Stefancik et al. | 600/419 |
| 6,785,409 B1 * | 8/2004 | Suri | 382/128 |
| 6,904,306 B1 * | 6/2005 | Wu et al. | 600/420 |
| 6,925,321 B2 * | 8/2005 | Stefancik et al. | 600/419 |

OTHER PUBLICATIONS

"Semi-Automatic Segmentation of Non-Viable Cardiac Tissue Using Cine and Delayed Enhancement Magnetic Resonance Images", O'Donnell et al., Medical Imaging 2003: Physiology and Function: Methods, Systems and Applications, Proc. Of the SPIE, vol. 5031, Feb. 16-18 200ry_~,. 242-251.*

* cited by examiner

*Primary Examiner*—Seyed Azarian
(74) *Attorney, Agent, or Firm*—Donald B. Paschburg; F. Chau & Associates, LLC

(57) ABSTRACT

A method and device for image processing to determine image characteristics includes operations of segmenting of first images to create segmentation contours corresponding to the first images; and registering the segmented first images to second images. Further, operations of transferring the segmentation contours from the first images to second images; and fitting the transferred segmentation contours in the second images are performed.

23 Claims, 15 Drawing Sheets

SYSTEM AND METHOD FOR A SEMI-AUTOMATIC QUANTIFICATION OF DELAYED ENCHANCEMENT IMAGES

CROSS-REFERENCE TO RELATED APPLICATION

This application claims the benefit of U.S. Provisional Application No. 60/550,874 filed on Mar. 5, 2004, titled as "Semi-Automatic Quantification of Delayed Enhancement Images", contents of which are incorporated herein by reference.

TECHNICAL FIELD

The present invention generally relates to medical image processing and more particularly to detecting anatomical abnormalities in medical images.

DISCUSSION OF THE RELATED ART

Delayed Enhancement Magnetic Resonance (DEMR) is an image acquisition technique by which non-viable (i.e., dead) myocardial tissues appear with increased signal intensity (i.e. they are brighter than the surrounding viable tissue). The extent of non-viable tissue in the Left Ventricle (LV) of the heart is a direct indicator of patient survival rate. However, determination of viable and non-viable LV heart tissues in DEMR images is a non-trivial task. Hence, there is a need for techniques to determine viable and non-viable tissues in DEMR images.

Acquisition of DEMR requires a waiting period of about 20-30 minute. During this 20-30 minute waiting period other MR protocols are generally acquired, specifically Cine MR, a time series over the cardiac cycle. Compared to DEMR, in Cine MR the LV myocardium appears with much more uniform texture with which contraction of the myocardium can be visualized.

Segmentation of the LV in DEMR images is challenging since reliable prediction of its intensity characteristics is difficult. Compared to segmentation of Cine MR images, in which assumptions may be made about the relative intensities of air, blood, and muscle, little can be known about the DEMR myocardium. Further, non-viable tissues may have intensities that render it indistinguishable from the blood pool. Thus, radiologists in analyzing DEMR images often refer to a "corresponding" Cine image in which the heart wall is visible. A Cine MR (Magnetic Resonance) image is considered a corresponding image that has the most similar slice plane with respect to the heart and closest trigger time in the cardiac cycle. Slice planes of Cine MR and DEMR images may not be identical due to patient motion or respiratory artifacts; and, the ECG time of the DEMR may not exactly match the temporal sampling of the Cine with respect to the ECG.

Regarding the classification of the non-viable myocardium, classifying myocardial tissues using a Support Vector Machine was described in U.S. patent application Ser. No. 10/677,190 to Thomas O'Donnell et al., which is titled "System and method for using delayed enhancement magnetic resonance imaging and artificial intelligence to identify non-viable myocardial tissue", the entire contents of which are incorporated herein by reference. This SVM based classification used certain feature like the thickness of the heart wall and the change in thickness over time as features for SVM based classification and classification was based on sectors.

SUMMARY

In one aspect of the invention, a method and device for image processing to determine image characteristics includes operations of segmenting of first images to create one or more segmentation contours corresponding to the first images; and registering the segmented first images to second images. Further, operations of transferring the segmentation contours from the first images to second images; and fitting the transferred segmentation contours in the second images are performed.

In another aspect of the invention, a method for processing Cine MR (Magnetic Resonance) images that include corresponding cine images and Delayed Enhancement Magnetic Resonance (DEMR) Viability image(s) to analyze a candidate includes the operations of segmenting the Cine MR images to create one or more segmentation contours; and Deforming the segmentation contour such that it is interpolated to appear as it would for a phase corresponding to the viability image's phase to generate a prior model. Further, operations of localizing the candidate in the viability image by registering the corresponding cine images to the viability image; and creating one or more energy fields image to fit the prior model to the viability image are performed. Operations for fitting the prior model to the energy field images using or more transformations; and classifying the candidate using a classifier in the processed viability images that include the fitted prior model are also performed.

BRIEF DESCRIPTION OF DRAWINGS

Exemplary embodiments of the present invention are described with reference to the accompanying drawings, of which.

DETAILED DESCRIPTION OF THE EXEMPLARY EMBODIMENTS

The exemplary embodiments of the present invention will be described with reference to the appended drawings.

The following description will assume that sets of Cine MR (Magnetic Resolution) images and Delayed Enhancement Magnetic Resolution (DEMR) images are obtained for a heart scan with the Left Ventricle (LV) being the target. A two-stage technique for quantifying the extent of non-viable tissue is described. First, the myocardium in the DEMR images is segmented. Then, the myocardial pixels are classified as corresponding to either a viable or a non-viable tissue. Segmentation of the myocardium is challenging because its intensity characteristics cannot be reliably predicted. Further, it may be impossible to distinguish the infracted tissues from the ventricular blood pool. Therefore, MR (Magnetic Resonance) Cine (also known as "regular or normal" MR images) images are acquired in the same session (in which the myocardium has a more predictable appearance) in order to create a prior model of the myocardial borders. Using the image features in the DEMR images and this prior model, the myocardium can be segmented consistently. In the second stage of processing, a Support Vector Machine (SVM) is employed to distinguish viable from non-viable pixels based on training from an expert.

Figure 1:
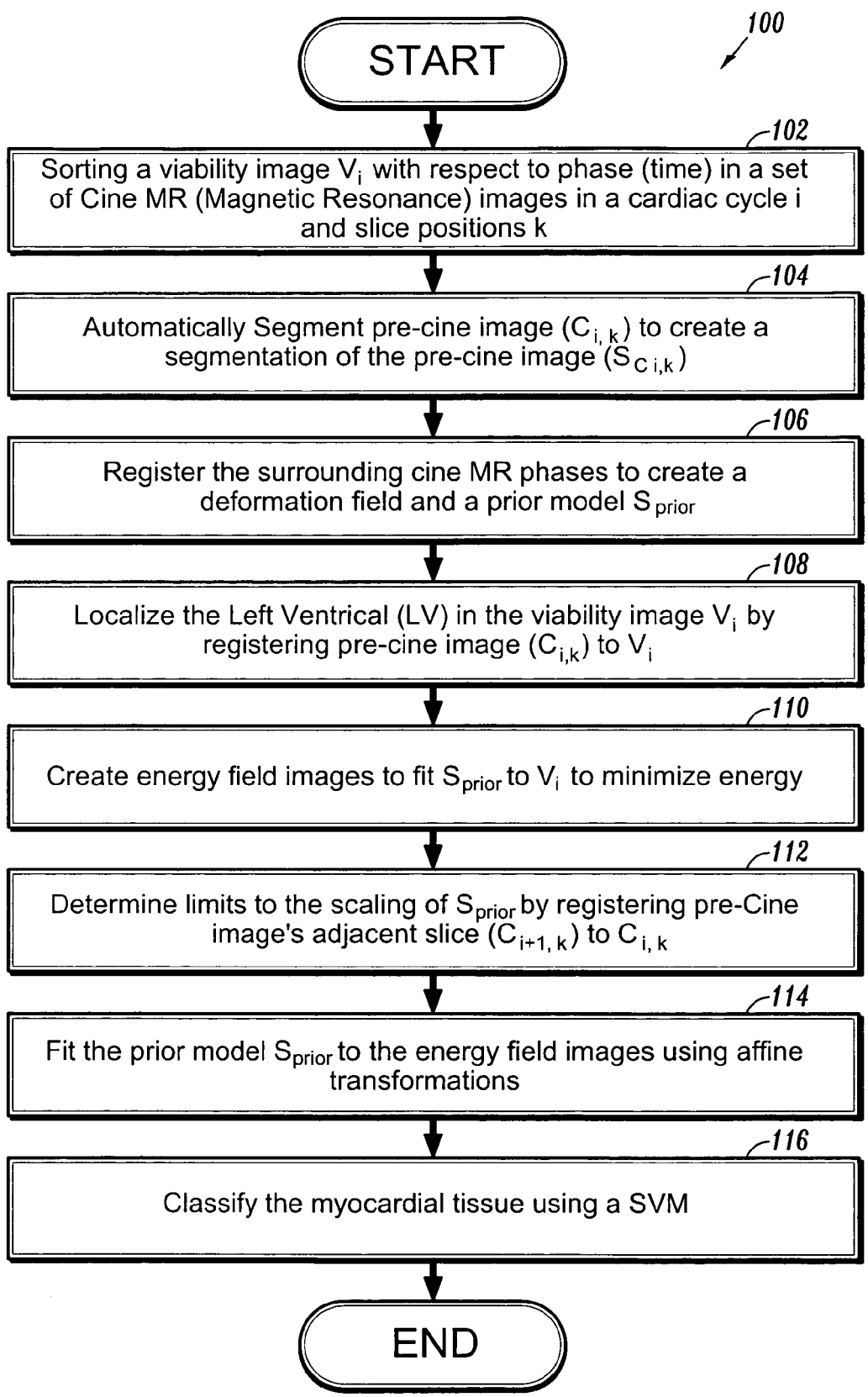
FIG. 1 is a flowchart for segmenting and classifying the myocardium in the DEMR images in an exemplary embodiment of the invention.

FIG. 1 is a flowchart for segmenting and classifying the myocardium in the DEMR images in an exemplary embodiment of the invention. In the description below, $V_i$ represents a Viability image; $C_{i,k}$ represents Cine MR image just before the phase of the Viability image, i.e., "Corresponding Cine"; $C_{i,k+1}$ represents Cine image just after the phase of the Viability image, i.e., a "Post-Cine" image; $C_{i+1,k}$ represents Cine image adjacent spatially to Corresponding Cine, a "Corresponding Cine's Adjacent Slice" image; $S_{C_{i,k}}$ represents a segmentation contour, i.e., "Segmentation of Corresponding Cine"; and $S_{prior}$ represents the segmentation of corresponding cine image interpolated to the phase of the viability image to form a prior model of the myocardium in the viability image, i.e., a "Prior Model".

At a step 102 of the flowchart 100, sorting of a viability image $V_i$ is performed with respect to phase (time) in a set of Cine MR (Magnetic Resonance) images C. At a step 104, automatic segmentation of corresponding cine image $C_{i,k}$ to create a segmentation of the corresponding cine image $S_{C_{i,k}}$ is performed. At a step 106, surrounding cine MR phases are registered to create a deformation field. The deformation field is used to interpolate the cine contour $S_{C_{i,k}}$ to the phase of the viability image. This involves registering of corresponding cine image $C_{i,k}$ to post cine image $C_{i,k+1}$ to obtain a deformation field between them. Then, the cine contour $S_{C_{i,k}}$ can be interpolated to form a prior model $S_{prior}$. At a step 108, Left Ventricle(LV) is localized in $V_i$ by registering corresponding cine image $C_{i,k}$ to $V_i$. At a step 110, energy field images are created to fit prior model $S_{prior}$ to $V_i$ by minimizing the energy. At a step 112, limits to the scaling of $S_{prior}$ are determined by registering the corresponding Cine image's adjacent Slice $C_{i+1,k}$ to corresponding cine image $C_{i,k}$. At a step 114, fitting of prior model $S_{prior}$ to the energy field images is carried out using affine transformations. At a step 116, classification of the myocardial tissue using an SVM is performed.

Figure 2:
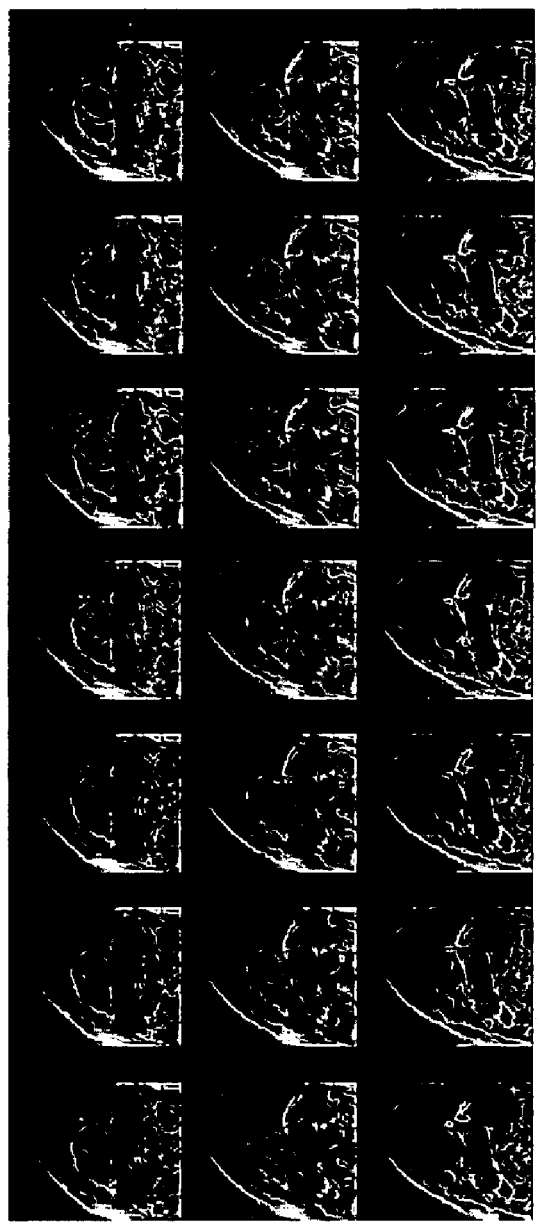
FIG. 2 shows a block of Cine MR images used in an exemplary embodiment of the invention.

FIG. 2 shows a block of Cine MR images used in an exemplary embodiment of the invention. Let $\overline{C}_{n,m}$ represent a n×m matrix of Cine MR images with n adjacent slice positions and m consecutive phases equally spaced in time in the cardiac cycle. Cine MR images 200 are shown as n Cine slices positions 202 and m Cine slice phases 204.

The process of finding one of the cine phases 204 that is closest to one of the viability phases in the DEMR images is described next. Let $\overline{V}_n$ represent the set of n DEMR images with n adjacent slice positions. For a $V_i \epsilon \overline{V}_n$, let the corresponding cine image be $C_{i,k} \epsilon \overline{C}_{n,m}$ such that, $$k = \left\lfloor \frac{t_{V_i} - t_{C_{i,1}}}{t_{C_{i,m}} - t_{C_{i,1}}} \right\rfloor m,$$

where t represents the Echo CardioGram (ECG) trigger time of the image, k represents phase in milliseconds, and i represents the slice position A myocardial border detection algorithm is applied to $C_{i,k}$ which employs a region segmentation combined with an active contour formulation The result, which may be manually edited, is a contour $S_{C_{i,k}}(r)$, the segmentation of the corresponding Cine image. Adjacent to the corresponding cine image $C_{i,k}$ is $C_{i,k+1}$ such that $t_{C_{i,k}} \leq t_{V_i} \leq t_{C_{i,k+1}}$.

Figure 3:
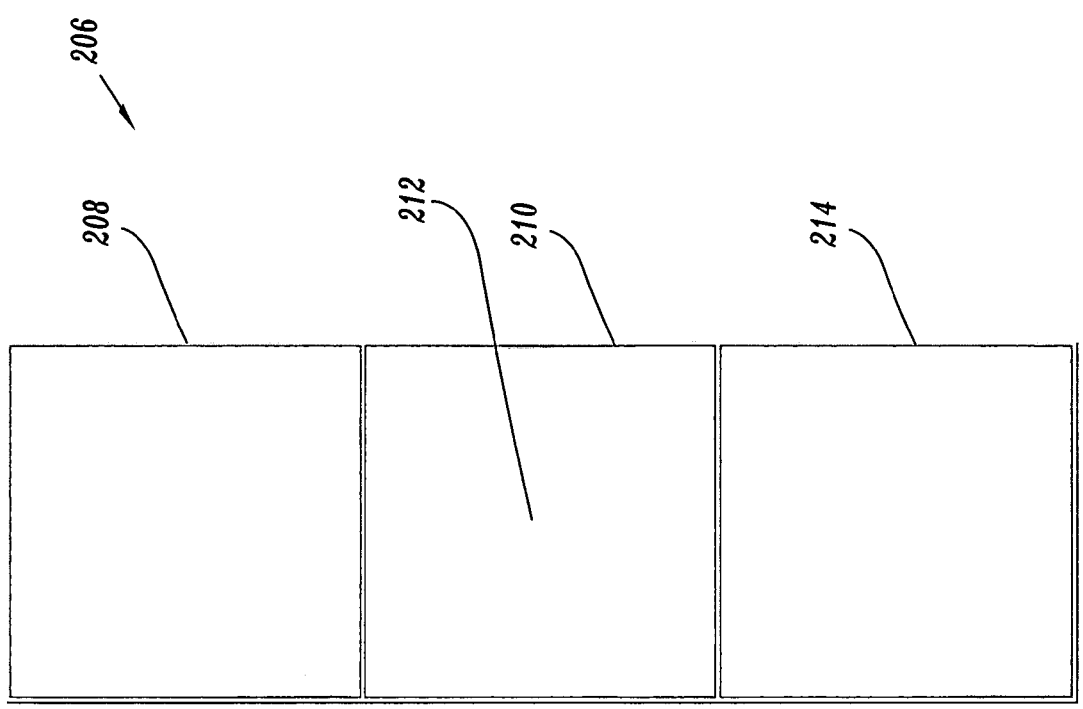
FIG. 3 shows DEMR Viability Images and a specific viability phase in an exemplary embodiment of the invention.

FIG. 3 shows DEMR Viability Images and a specific viability phase in an exemplary embodiment of the invention. Viability images 206 are shown. Viability images 208, 210 and 214 form part of the DEMR viability images. The DEMR images are considered viability images.

A single slice i of viability images is represented as $V_i$. The next goal is to find the myocardial border in $V_i$ and classify the tissues in it as viable (living) or non-viable (dead). The LV border is to be determined near a region pointed out by the LV border indicator 212.

Localization of the LV in the DEMR image is described next. A single phase i (212) of viability images is represented as $V_i$. The center of the blood-pool in $V_i$ (212) is computed by registering $C_{i,k}$ with $V_i$ resulting in the deformation field $D(\vec{x})$ such that $C_{i,k}(\vec{x}) \mapsto V_i(D(\vec{x}))$. The segmentation $S_{C_{i,k}}(r)$ is then deformed by $D(\vec{x})$ to arrive at $S_{center}(r) = D(S_{C_{i,k}}(r))$. The centroid of $S_{center}$, $$\vec{x}_{center} = \int_{S_{center}} S_{center}(r) dr$$

is the position from which search of the LV in $V_i$ is started. The deformation field can be too imprecise for any other inferences.

Figure 4:
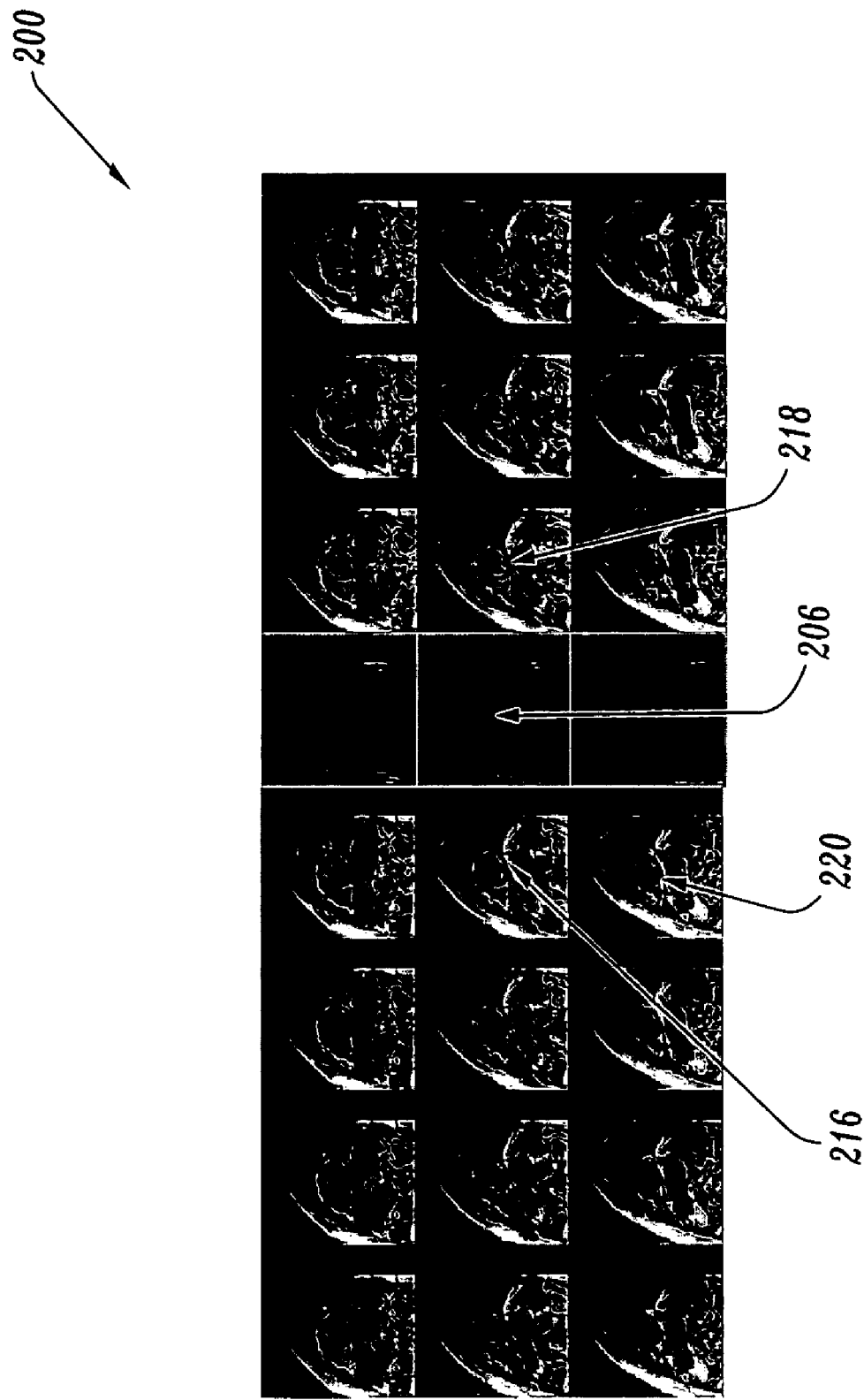
FIG. 4 shows sorting of the viability images in an exemplary embodiment of the invention.

FIG. 4 shows sorting of the viability images in an exemplary embodiment of the invention. Viability images 206 are sorted with respect to phase, i.e., time into the set of Cine MR images 200. Corresponding cine image 216 ($C_{i,k}$) is shown. Adjacent cine images 218 and 220 representing cine images $C_{i+1,k}$ and $C_{i,k+1}$ are shown as next to the corresponding cine image 216.

Figure 5:
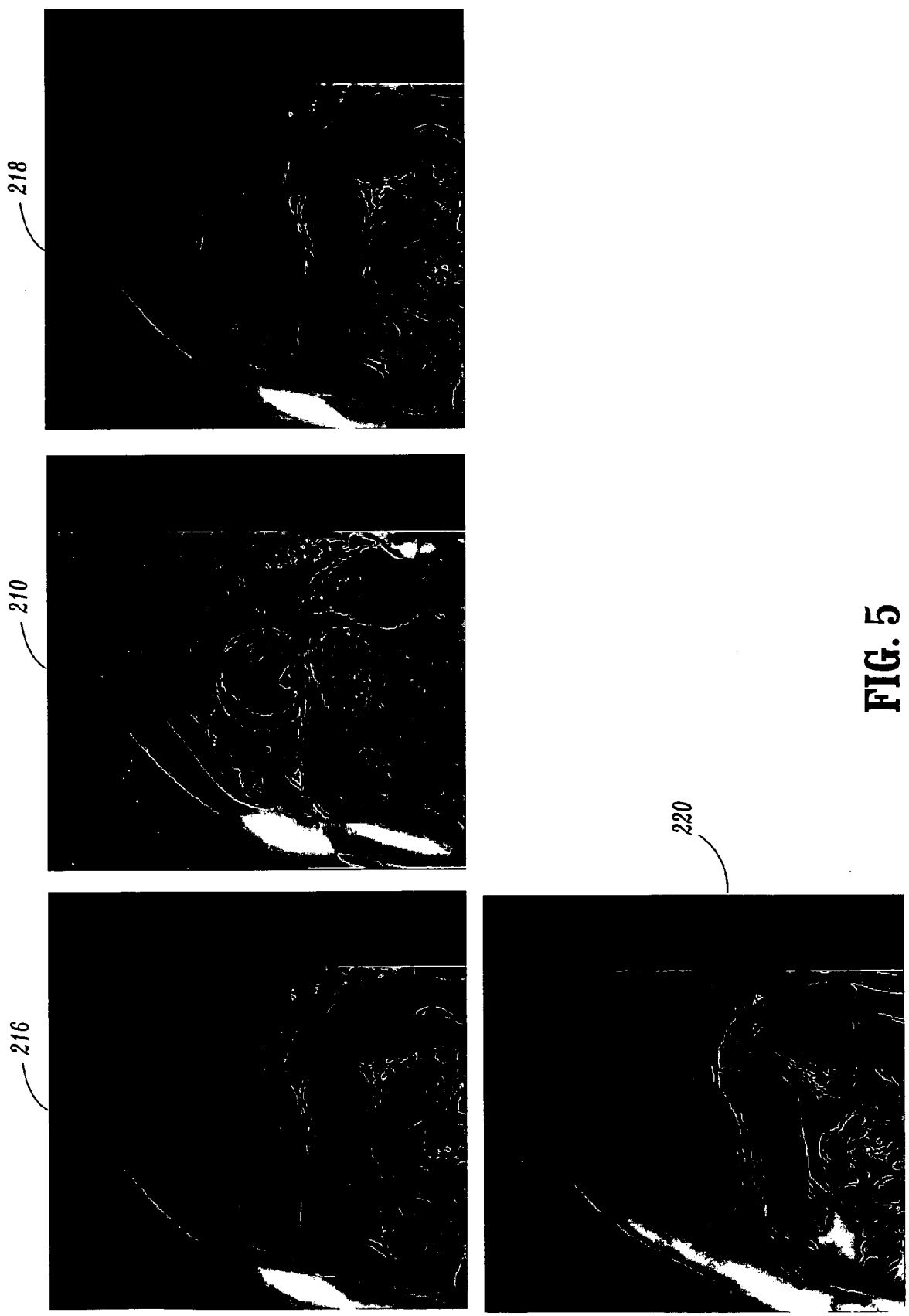
FIG. 5 shows close-ups of the corresponding and adjacent images in an exemplary embodiment of the invention.

FIG. 5 shows close-ups of the corresponding and adjacent images in an exemplary embodiment of the invention. DEMR viable phase 210 shows the a single slice i of viability images is represented as $V_i$. Corresponding cine image 216 ($C_{i,k}$) is shown. Adjacent cine images 218 and 220 representing cine images $C_{i+1,k}$ and $C_{i,k+1}$ are shown as next to the corresponding cine image 216.

Figure 6:
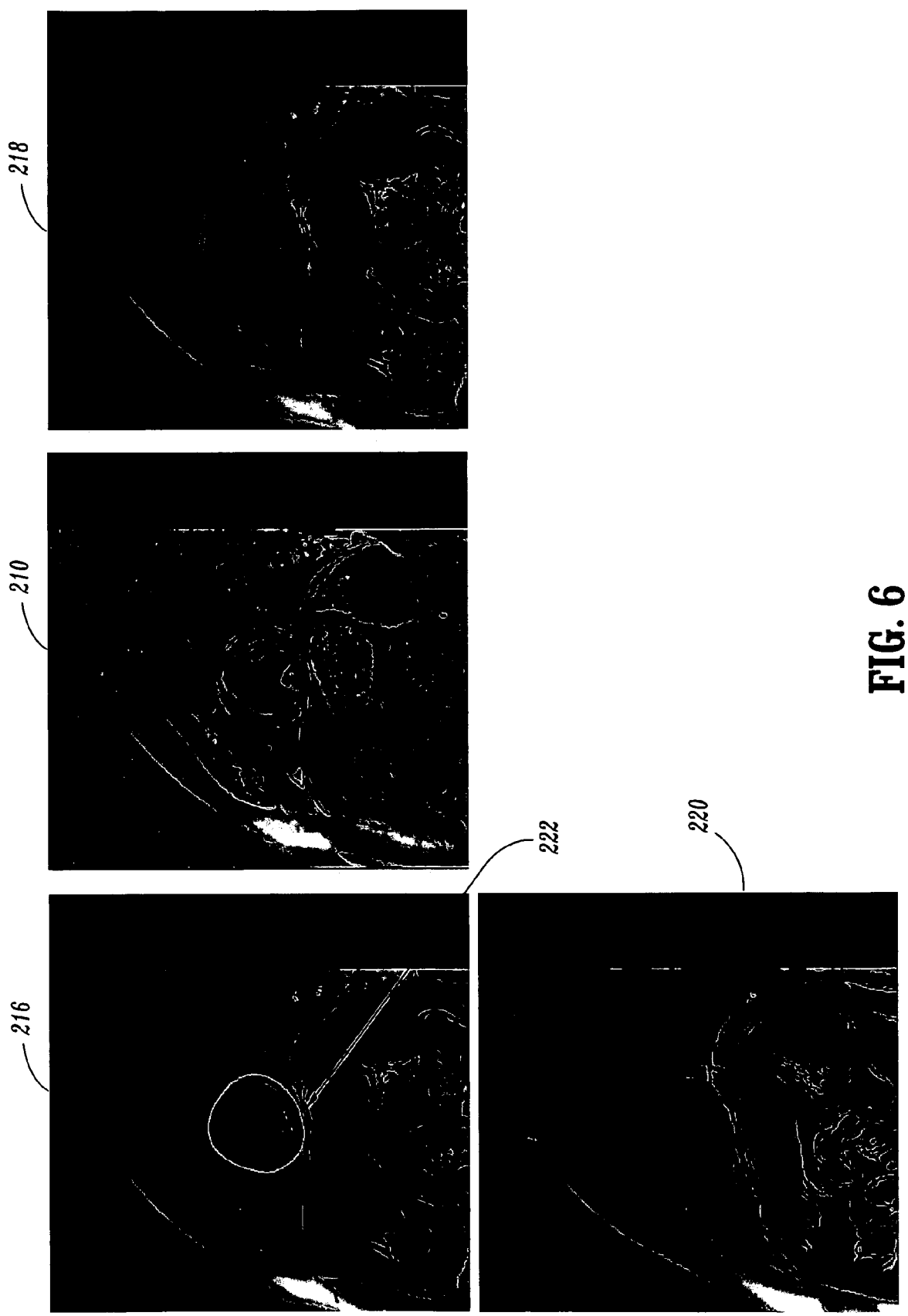
FIG. 6 shows a contour obtained from an automatic segmentation of corresponding cine image $C_{i,k}$ in an exemplary embodiment of the invention.

FIG. 6 shows a contour obtained from an automatic segmentation of corresponding cine image $C_{i,k}$ in an exemplary embodiment of the invention. DEMR viable phase 210 image shows the a single slice i of viability images which is represented as $V_i$. Corresponding cine image 216 ($C_{i,k}$) is shown that includes the contour $S_{C_{i,k}}$ 222, which is obtained by the automatic segmentation of $C_{i,k}$. Adjacent cine images 218 and 220 representing cine images $C_{i+1,k}$ and $C_{i,k+1}$ are shown as next to the corresponding cine image 216.

Figure 7:
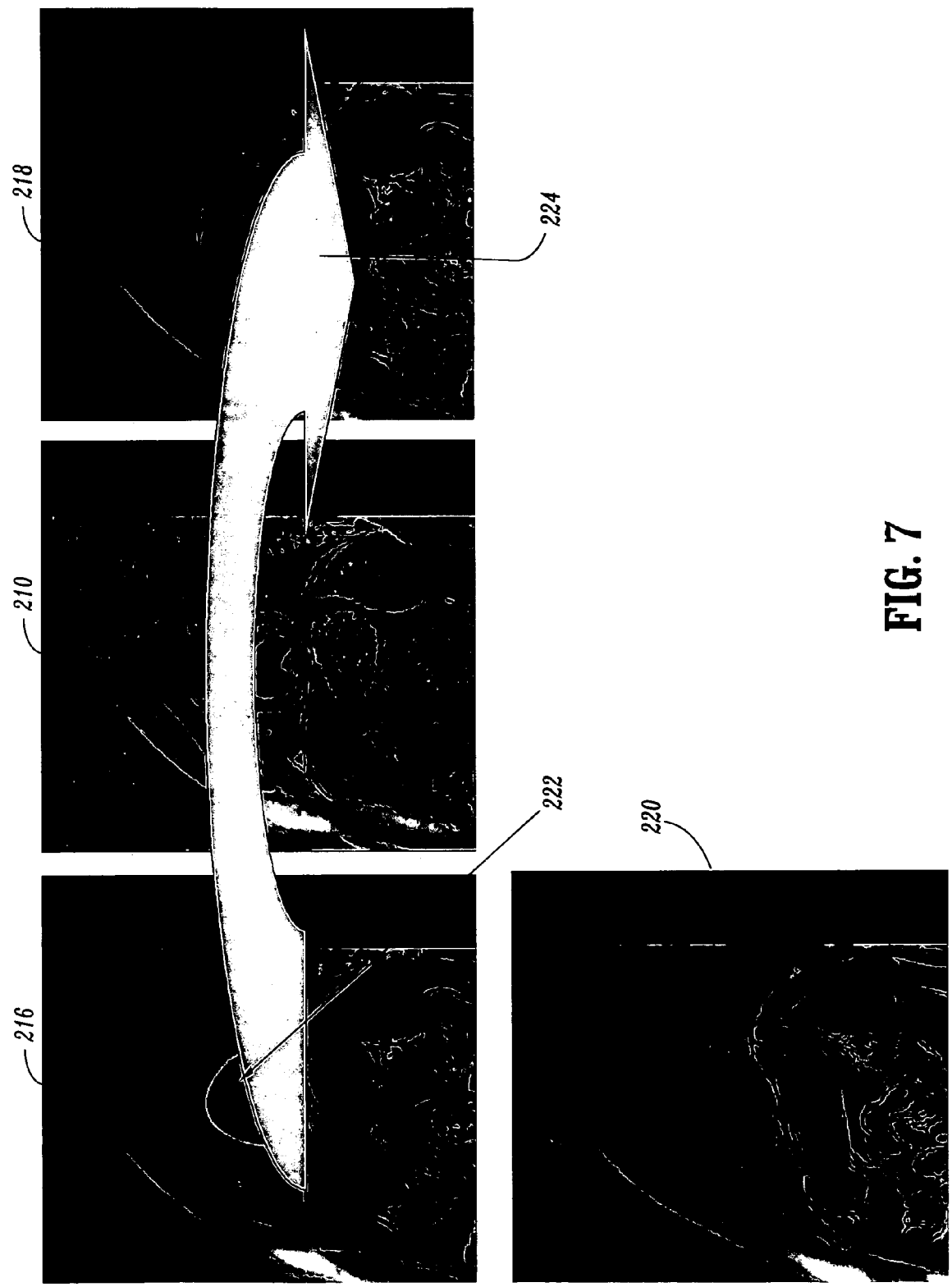
FIG. 7 shows registration of Cine MR phases to create a deformation field in an exemplary embodiment of the invention.

FIG. 7 shows registration of Cine MR phases to create a deformation field in an exemplary embodiment of the invention. DEMR viable phase 210 image shows a single slice i of viability images is represented as $V_i$. Corresponding cine image 216 ($C_{i,k}$) is shown that includes the contour $S_{C_{i,k}}$ 222, which is obtained by the automatic segmentation of $C_{i,k}$. An adjacent cine images 218 and 220 representing $C_{i+1,k}$ and $C_{i,k+1}$ are shown as next to the corresponding cine image 216. The cine image $C_{i,k}$ is registered to $C_{i,k+1}$ so as to obtain the deformation field between them. Thereafter, the contour $S_{C_{i,k}}$ 222 can be interpolated to create $S_{prior}$.

Determination of segmentation prior $S_{prior}$ is described next. $C_{i,k}$ is registered with $C_{i,k+1}$ using a non-rigid variational approach. The resulting deformation field, $U(\vec{x})$, such that $C_{i,k}(\vec{x}) \mapsto C_{i,k+1}(U(\vec{x}))$ is linearly interpolated as below, $$U'(\vec{x}) = \frac{(t_{V_i} - t_{C_{i,1}})}{(t_{C_{i,m}} - t_{C_{i,1}})} U(\vec{x}),$$

to calculate the deformation field at $t_{V_i}$. The above equation is the interpolated deformation field. This deformation field is then applied to $S_{C_{i,k}}(r)$ for obtaining to arrive at the segmentation prior, i.e., the segmentation of the cine acquisition interpolated to time $t_{V_i}$ as below:

$$S_{prior}(r) = U'(S_{C_{i,k}}(r))$$

Figure 8:
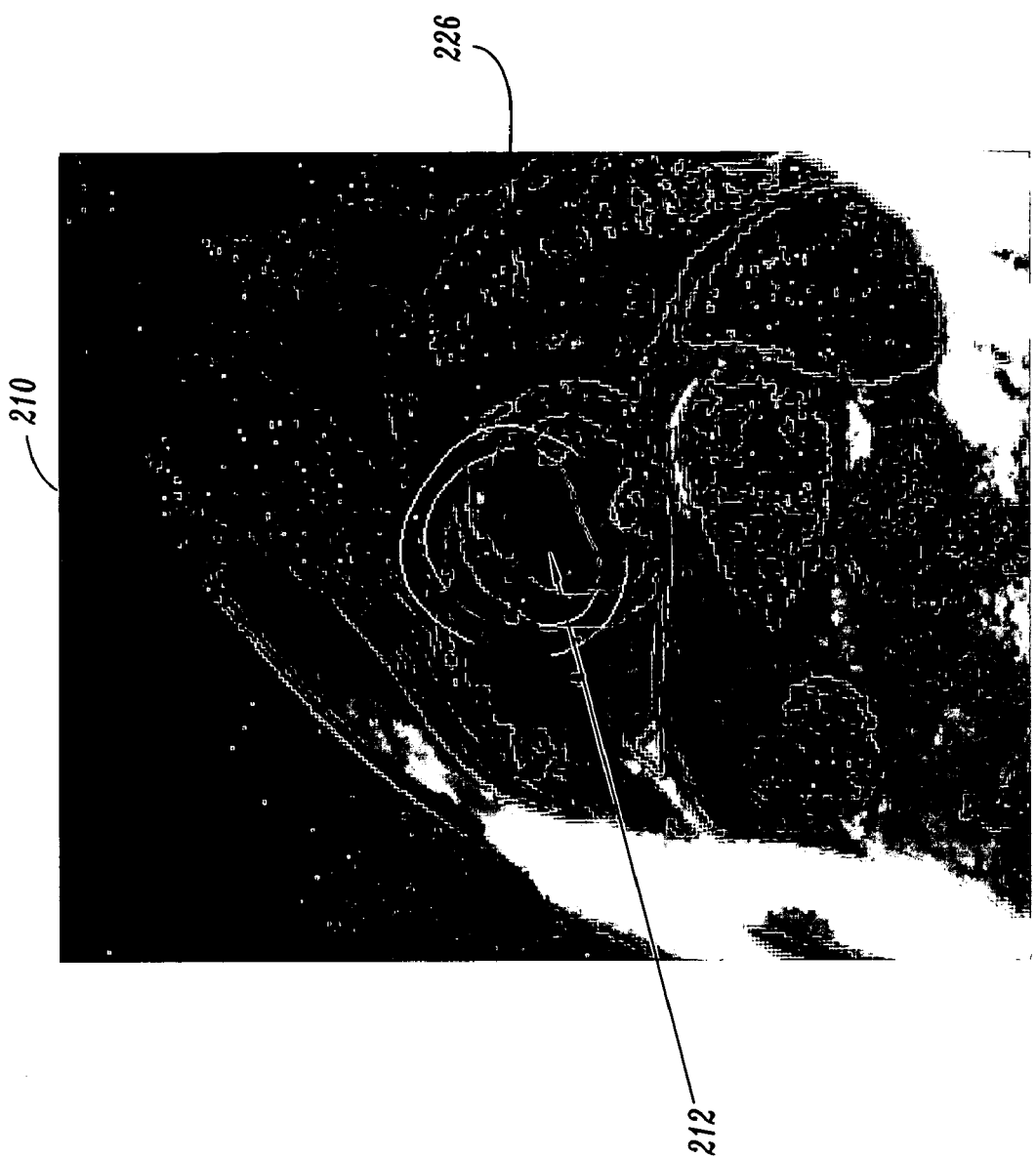
FIG. 8 shows the Sprior contour shape positioning in the context of the LV phase in an exemplary embodiment of the invention.

FIG. 8 shows the Sprior contour shape positioning in the context of the LV phase in an exemplary embodiment of the invention. The LV border indicator 212 represents the contour shape for the $V_i$ in a DEMR viable phase 210. A Sprior contour 226 should be similar to the correct contour shape for the phase of $V_i$. But, it may not be in the right position and may not be having the exact shape. Hence, the process of locating of the LV can be performed as described next.

Figure 9:
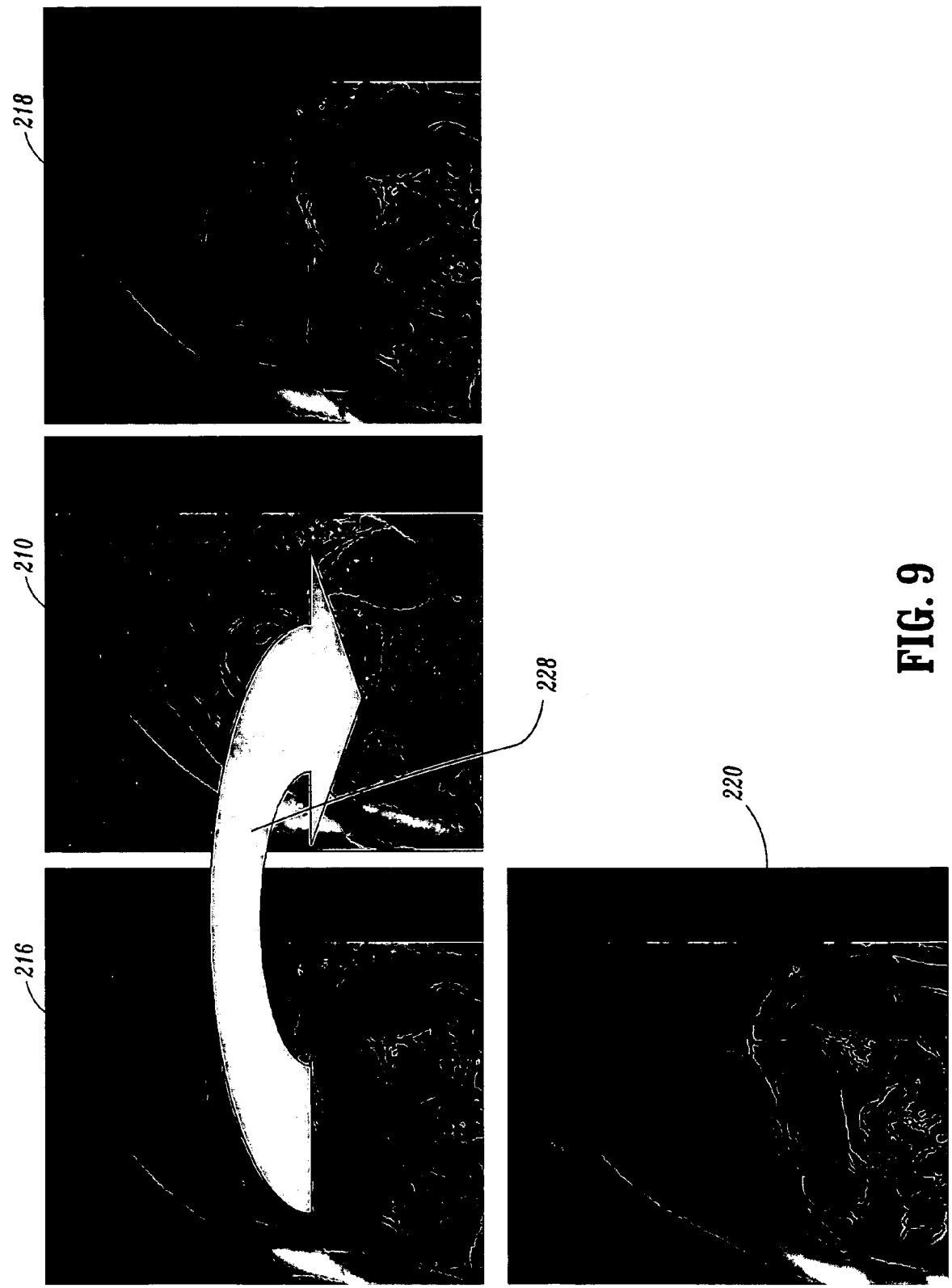
FIG. 9 shows localization of LV in $V_i$ in an embodiment of the invention.

FIG. 9 shows localization of LV in $V_i$ in an embodiment of the invention. Localization of LV in $V_i$ is performed by registering $C_{i,k}$ to $V_i$. This generates a mapping from $C_{i,k}$ to $V_i$. Since center of the heart is known from the center of the $S_{C_{i,k}}$, then the target location of the mapping can be known. DEMR viable phase 210 image shows a single slice i of viability images which is represented as $V_i$. Corresponding cine image 216 ($C_{i,k}$) is shown that includes the contour $S_{C_{i,k}}$ 222, which is obtained by the automatic segmentation of $C_{i,k}$. Adjacent cine images 218 and 220 representing $C_{i+1,k}$ and $C_{i,k+1}$ are shown as next to the corresponding cine image 216. An LV localization arrow 228 shows graphically the mapping from $C_{i,k}$ to $V_i$.

Figure 10:
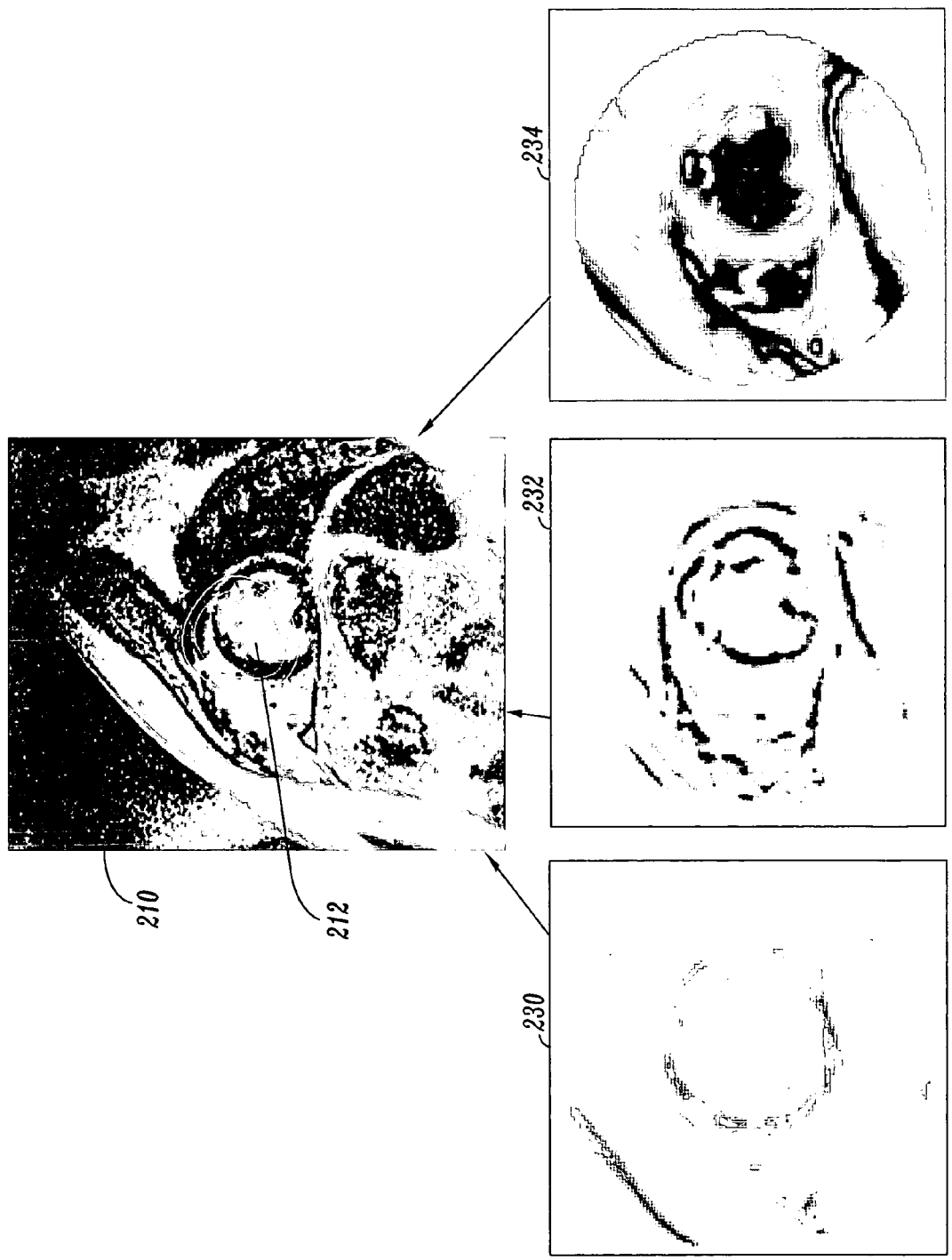
FIG. 10 shows the energy fields that fit $S_{prior}$ to $V_i$ in an embodiment of the invention.

FIG. 10 shows the energy fields that fit $S_{prior}$ to $V_i$ in an embodiment of the invention. Energy fields are created to fit $S_{prior}$ to $V_i$. The DEMR viable phase 210 shows LV border indicator 212. The $S_{prior}$ in the DEMR viable phase 210 is moved over each of the three energy fields 230, 232 and 234 to try and minimize the energy in the $S_{prior}$. Energy field 230 represents an inner contour energy. Energy field 232 represents an outer energy contour. Energy field 234 represents energy of the blood pool (i.e., "BloodPoolNess Energy").

Figure 11:
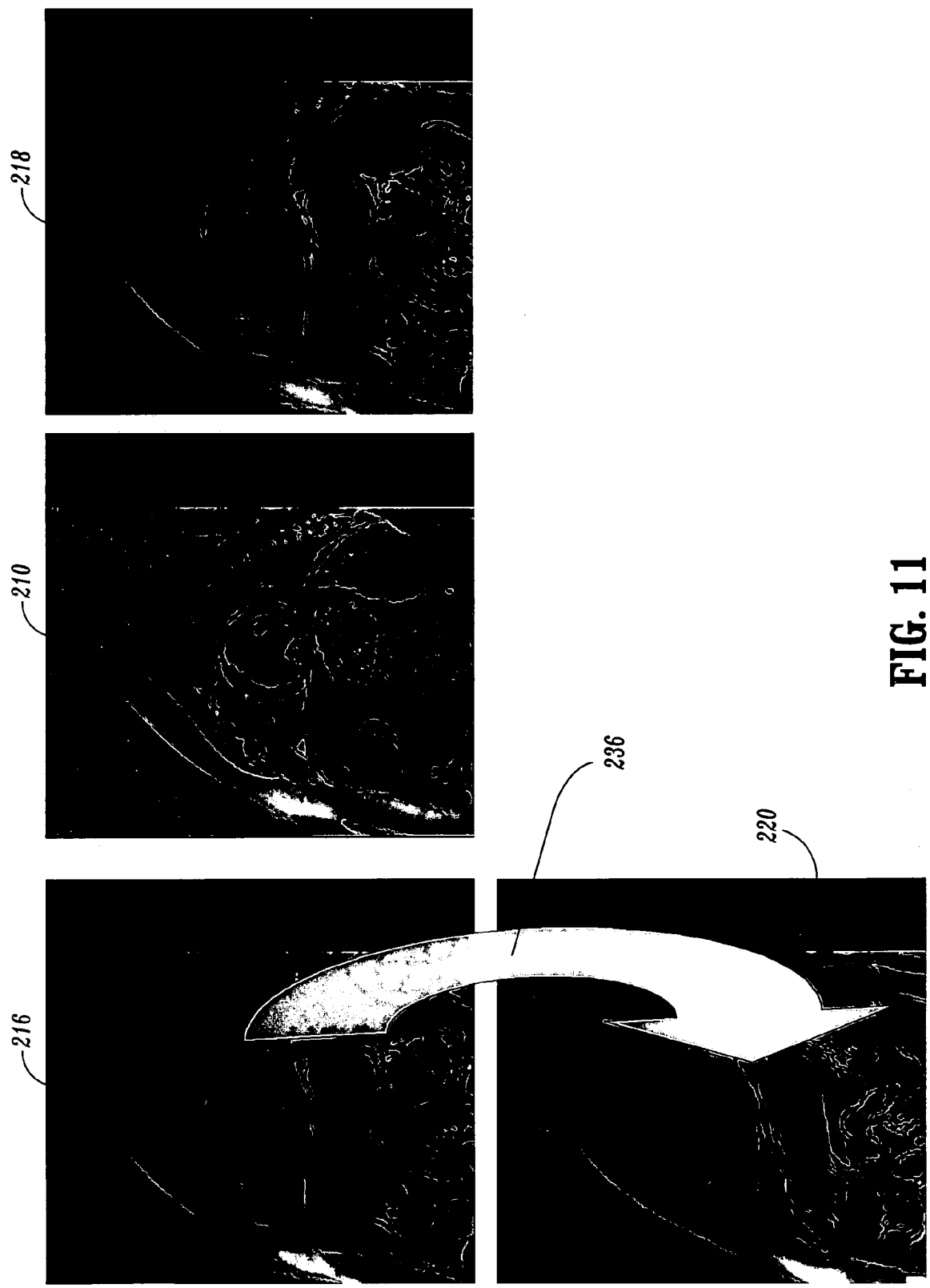
FIG. 11 shows the process of determining limits on $S_{prior}$ scaling in an exemplary embodiment of the invention.

FIG. 11 shows the process of determining limits on $S_{prior}$ scaling in an exemplary embodiment of the invention. DEMR viable phase 210 is $V_i$. Corresponding cine image 216 ($C_{i,k}$) is shown that includes the contour $S_{C_{i,k}}$ 222, which is obtained by the automatic segmentation of $C_{i,k}$. Adjacent cine images 218 and 220 representing $C_{i+1,k}$ and $C_{i,k+1}$ are shown as next to the corresponding cine image 216. A $C_{i+1,k}$ to $C_{i,k}$ localization arrow 236 shows graphically the mapping from $C_{i+1,k}$ to $C_{i,k}$. The $C_{i,k}$ and $C_{i+1,k}$ are adjacent slice positions. It can be assumed that $S_{prior}$ should not scale so that it appears like the next slice.

Figure 12:
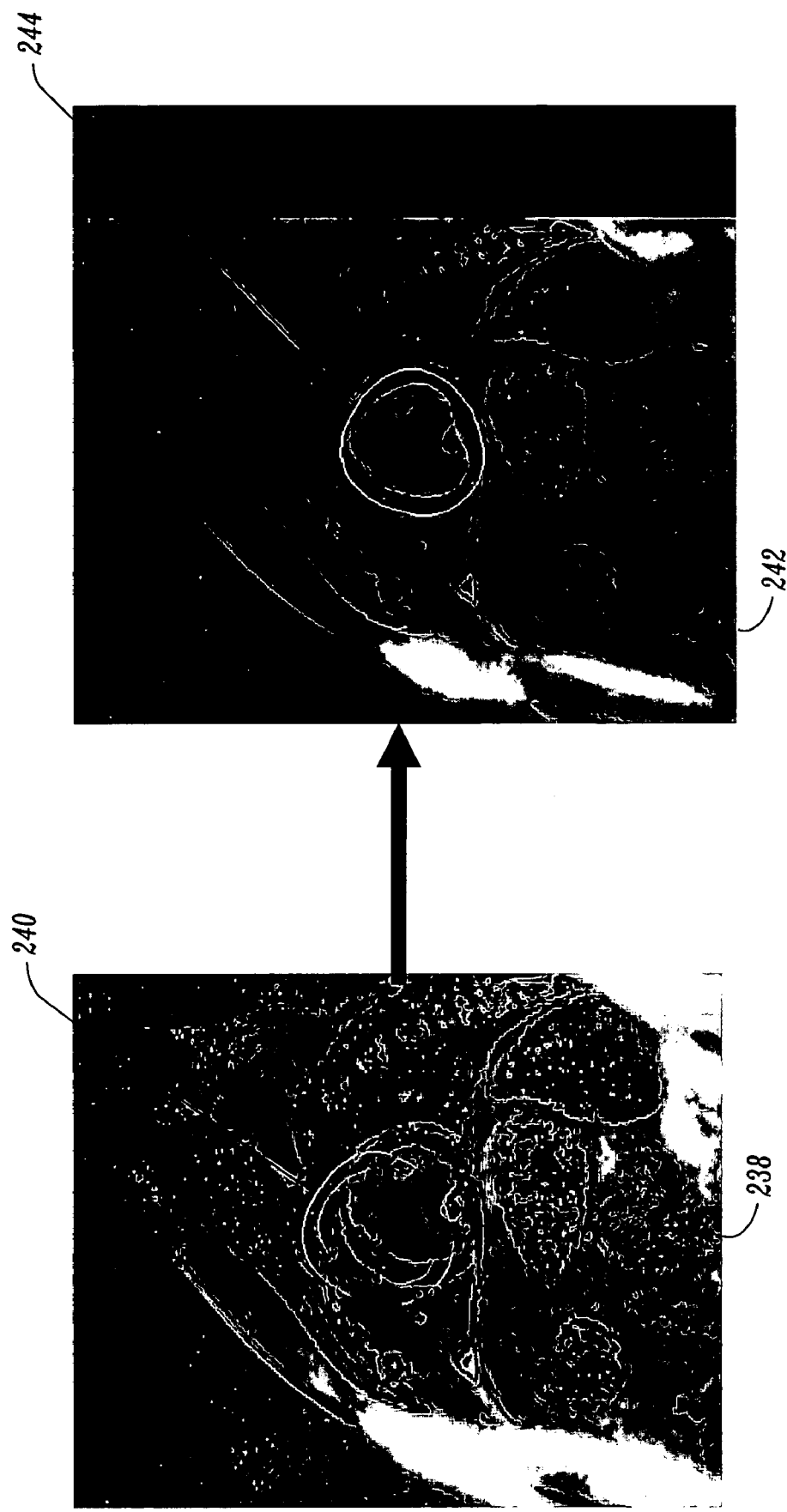
FIG. 12 shows fitting of the $S_{prior}$ to the energy images shown in FIG. 10 in an exemplary embodiment of the invention.

FIG. 12 shows fitting of the $S_{prior}$ to the energy images shown in FIG. 10 in an exemplary embodiment of the invention. Unfitted $S_{prior}$ image 238 shows an unfitted $S_{prior}$ 240, which is fitted using affine transformations (e.g., translation, scaling, shearing) which limit the scaling to the bounds found in above in context of FIG. 11. Fitted $S_{prior}$ image 242 shows a $S_{prior}$ 244 that is fitted properly. Alternatively, a free-form deformation model can be used for fitting the prior model to the energy field images.

Determination of the LV borders in the DEMR Image is described next. The prior model, $S_{prior}$, is deformed to fit to the DEMR image $V_i$ to maximize the probability that the resulting $S_{V_i}$ is the correct segmentation of $V_i$. In the fitting process, an affine registration with five parameters is applied: translation in the x and y dimensions $\vec{\tau}$, shearing parameters $s_q$ and $s_m$, and a scaling parameter $\omega$. The translation is bound by the distance of 10 pixels but is allowed to change without penalty. Also, the shearing is bound by ±60 degrees and ±%20 scaling again without any penalty.

The scale bound, $\omega'$, is based on the change in the size of the LV from slice level i to an adjacent slice level, i+1 or i−1. The slice level with the maximal change is selected in the case of i≠1,m. It can be assumed that the change in the scale is due to motion artifacts, through-plane motion, etc., and will not be greater than $\omega'$.

The Computation of scale bound $\omega'$ is described next. For brevity, it is can be assumed that the adjacent slice is i+1. $C_{i,k}$ is registered with $C_{i+1,k}$ resulting in the deformation field $F(\vec{x})$ such that $C_{i,k}(\vec{x}) \mapsto C_{i+1,k}(F(\vec{x}))$. Then, the average of the deformation between the endo and epi contours of $S_{C_{i,k}}(r)$ can be calculated as below:

$$\vec{g} = \oint_{S_{C_{i,k}epi}} F(\vec{x})dr - \oint_{S_{C_{i,k}epi}} \vec{x}dr$$

The scale bound, $\omega'$, is then the norm of $\vec{g}$, $\omega' = \|\vec{g}\|_2$.

Penalty upon scaling considerations are described next. Unlike translation, $\vec{\tau}$, a penalty is incurred on scaling. This penalty is a coefficient in the energy formulation that is maximized. The penalty varies from 1 (no penalty) to $e^{-1}$ (maximal penalty resulting from a scaling equal to the scale bound $\omega'$) and is bell shaped. In at least one exemplary embodiment, the scale $\omega$ is iteratively increased by 1.5% from a value of 1 to $\omega'$ (similarly decreased to $-\omega'$) with the total energy formulation is evaluated at each step. Thus, at iteration $\gamma$, the scale $\omega$ is $\omega=(1.015)^\gamma$.

The penalty for a scale $\omega$ is based on the ratio of the iteration number, $\gamma$, and the iteration number corresponding to the maximal number of iterations, $\gamma'$ where $\omega'=(1.015)^{\gamma'}$. Specifically, $$e^{\frac{\gamma}{\gamma'}};$$

which may be rewritten as $$e^{\frac{\log_{1.015}\omega}{\log_{1.015}\omega'}}.$$

Energy maximization is described next. The energy formulation that is maximized by affine registration procedure is expressed as below:

$$S_{V_i}(r) = \underset{\vec{\tau},q,m,\omega}{\text{ArgMax}}\left\{\left(e^{\log_\omega' w}\right)\left\{W_1 \int_{S_{V_i}} E_1\, dr + W_2 \int_{S_{V_i}} E_2\, dr + W_3 \oint E_2\, dr\right\}\right\}$$

where $E_1(\vec{x})$ and $E_2(\vec{x})$ are the inner and outer edge images created by applying a steering filter and detecting directional dark to bright edges and bright to dark edges respectively. In at least one embodiment, the steering filter is a modified Sobel Filter that adapts its convolution kernel by using the relative location of the convolved pixel with respect to $\vec{x}_{center}$. $E_3(\vec{x})$ is the "bloodpoolness" image created by making an estimation of blood-pool's mean intensity via the intensities of the central pixels as calculated during the localization procedure.

Figure 13:
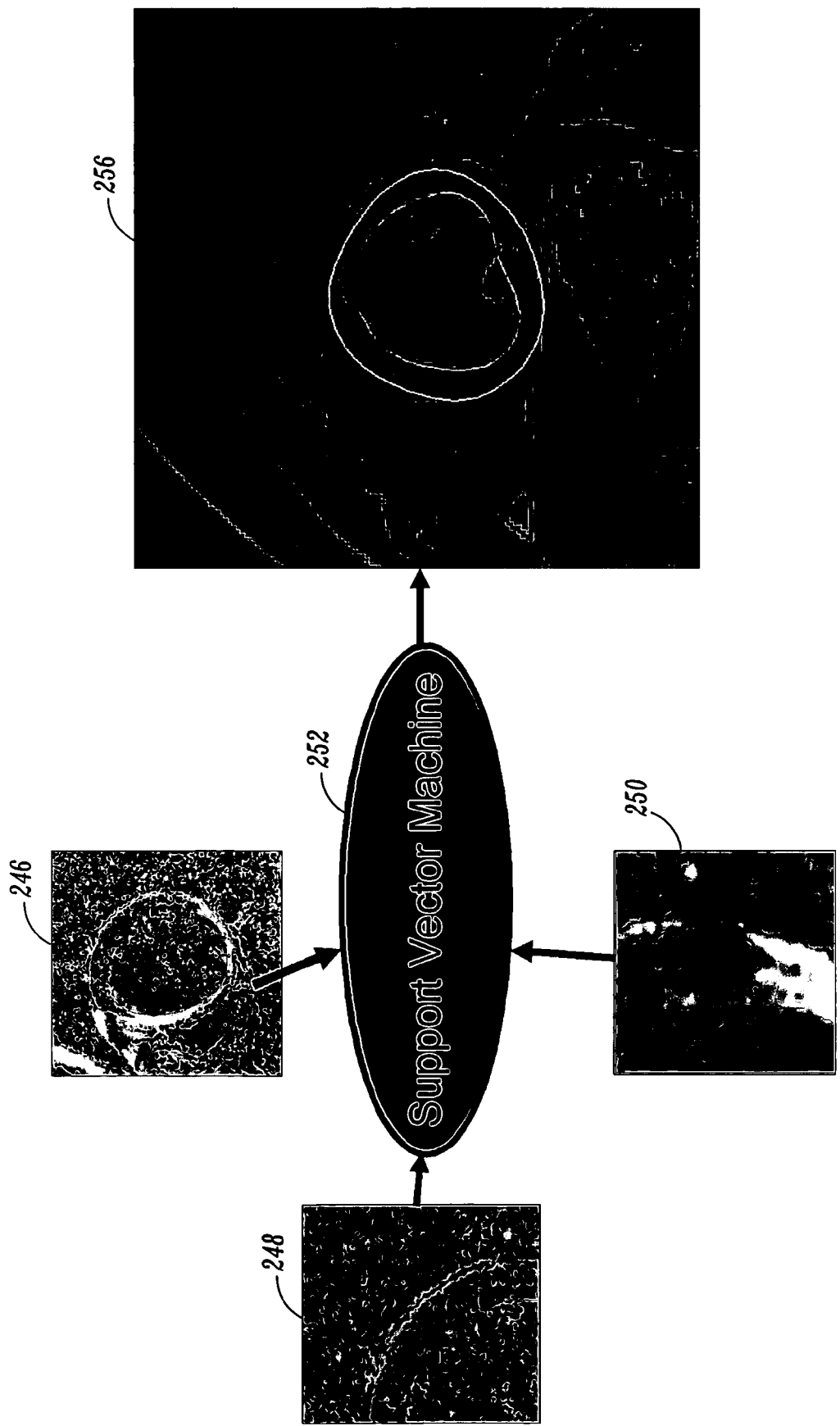
FIG. 13 shows a representation of classification process to generate a predicted image in an exemplary embodiment of the invention.

FIG. 13 shows a representation of classification process to generate a predicted image in an exemplary embodiment of the invention. A Support Vector Machine (SVM) 252 is inputted with image parameters to generate a predicted image. In at least one embodiment the image parameters can be image intensity, relative intensity and image homogeneity. Here, a image intensity sample 246, a relative intensity 248 sample representing relative intensity of the myocardium and homogeneity 250 sample are shown as inputs to the SVM 252, which generates a generated/predicted image 256.

In at least one exemplary embodiment, a SVM is used to perform the classification of myocardial pixels once the borders, have been detected. This approach over automatic thresholding can be preferred since the distribution of gray levels in the myocardium is not strictly a bimodal distribution of non-viable (bright) and viable (dark) pixels. This is due to partial voluming effects and the degree of damage.

For a given kernel function of the SVM a Gaussian radial basis function of the form:

$$k(\bar{\phi}(\vec{x}), \bar{\phi}(\vec{x}')) = e^{-\|\bar{\phi}(x)-\bar{\phi}(x')\|^2/2\sigma^2},$$

where $\bar{\phi}$ is the vector of features. It may be shown that kernels of this form which follow form Mercer's conditions have corresponding optimization problems that are convex, thus lacking local minima. To determine $\sigma$ in such kernel as well as K, a compromise between maximizing the margin and minimizing the number of training set errors, here a "leave-one-out strategy" was employed.

The following three features make up $\bar{\phi}$: The first feature, $\phi_1$, is the intensity of a pixel, $I_p$, relative to the average myocardial intensity, $$\overline{I_M} = \frac{\sum_{p\in M} I_p}{\sum_{p\in M} 1},$$

thus $$\phi_1 = \frac{I_p}{\overline{I_M}},$$

The second of these features is the standard deviation $\phi_2=\text{std}(I_r)$ of the relative pixel intensities with respect to its next neighbors. The final feature $\phi_3$ is related to the image as a whole and not to a single pixel. This feature is called myocardial contrast and it is defined as $$\phi_3 = \frac{\overline{I_M}}{\overline{I}},$$

i.e., the ratio of the mean myocardial intensity $\overline{I_M}$ and the mean image intensity $\overline{I}$ of the image.

In at least one embodiment a classifying technique a threshold function is used in place of the SVM classifier described above.

Figure 14:
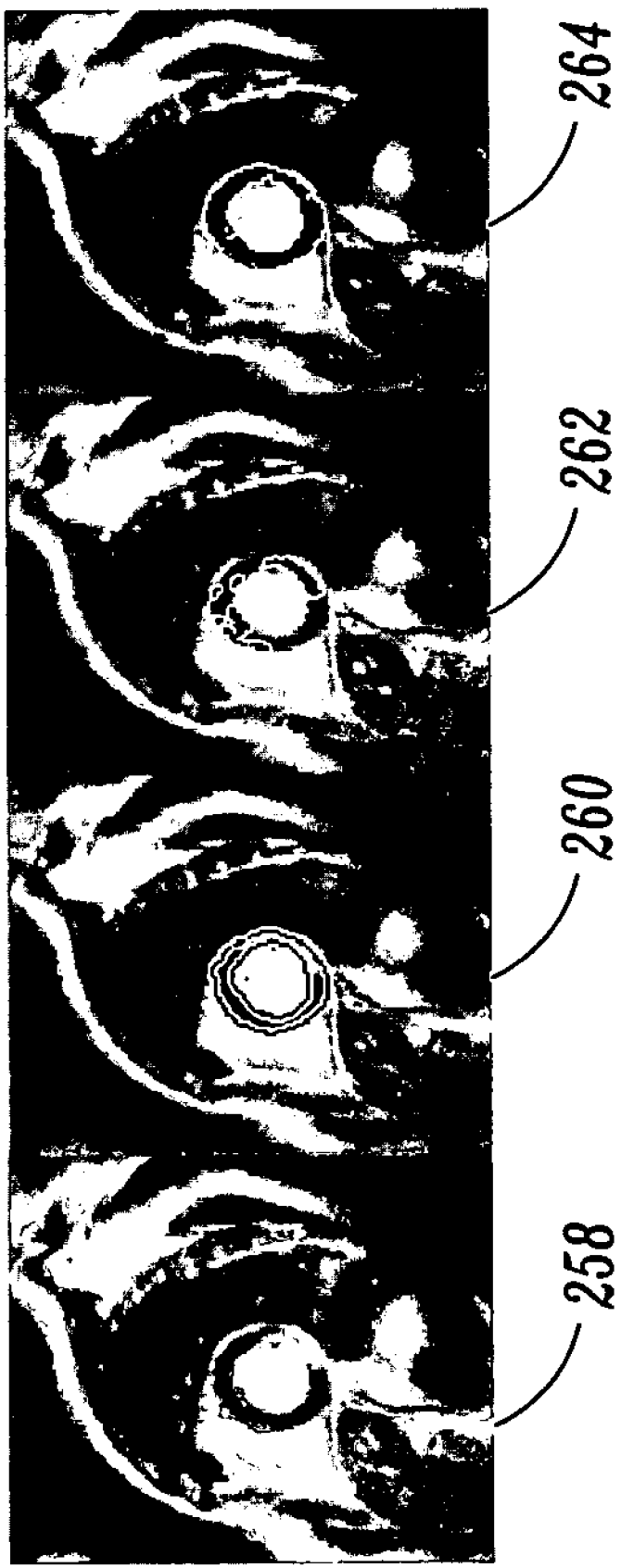
FIG. 14 shown images an exemplary experiment that uses the DEMR segmentation and classification techniques in an exemplary embodiment of the invention.

FIG. 14 shown images an exemplary experiment that uses the DEMR segmentation and classification techniques described above in an exemplary embodiment of the invention. Image Acquisition Parameters for the exemplary experiment are described next. Forty-five patients with known multi-vessel chronic ischemic heart disease underwent DEMR using an IR TurboFLASH sequence (FOV 300-360 mm2, TE 4 ms, TR 8 ms, flip angle 30 deg, TI 190-470 ms), approximately 20 minutes after intravenous 0.2 mmol/kg Gd-DTPA injection, with (n=9) or without (n=31) phase sensitive reconstruction. TrueFISP cine images (FOV 260-360 mm, TE 1.5 msec, TR 25-43 msec, 49-65o) were also acquired. For both types of imaging, 3 representative short-axis slices (thickness 6-10 mm) were acquired at the base, mid-ventricle and apex of the left ventricle during repetitive 10-15 second breath-holds. Image 258 is a DEMR image. Image 260 is the automatic segmentation. Image 262 is the classification of non-viable tissues (black pixels indicated non-viability). Image 264 shows agreement with the expert (black pixels indicate agreement; white pixels indicate disagreement).

The 45 patients in the exemplary experiment were broken down in to training (31 patients) and testing (14 patients) groups. For the training group the myocardial borders were manually drawn and the pixels classified as viable or non-viable by an expert. Appropriate SVM parameters were found to be $\sigma=0.01$ and K=20. For the testing group, segmentations and classifications were obtained automatically. For each of the 42 (14 test patients with 3 slices levels each) DEMR images, the myocardial borders on the corresponding Cine MR images were automatically segmented and an expert oversaw any additional editing. To evaluate the segmentation results, an expert delineated the ground truth myocardial borders on the DEMR images using the ARGUS package from SIEMENS. Using this ground truth it was found that the technique's contour pixel location error in at least one embodiment of the invention was 1.54 pixels on average with the standard deviation of 0.39 pixels over the 42 images (not shown). The 42 DEMR image slices segmented above were then classified using the SVM. The classification module achieved to 88.39% accuracy rate with a standard deviation of 6.15%, sensitivity of %81.34 and specificity of 92.28%.

Figure 15:
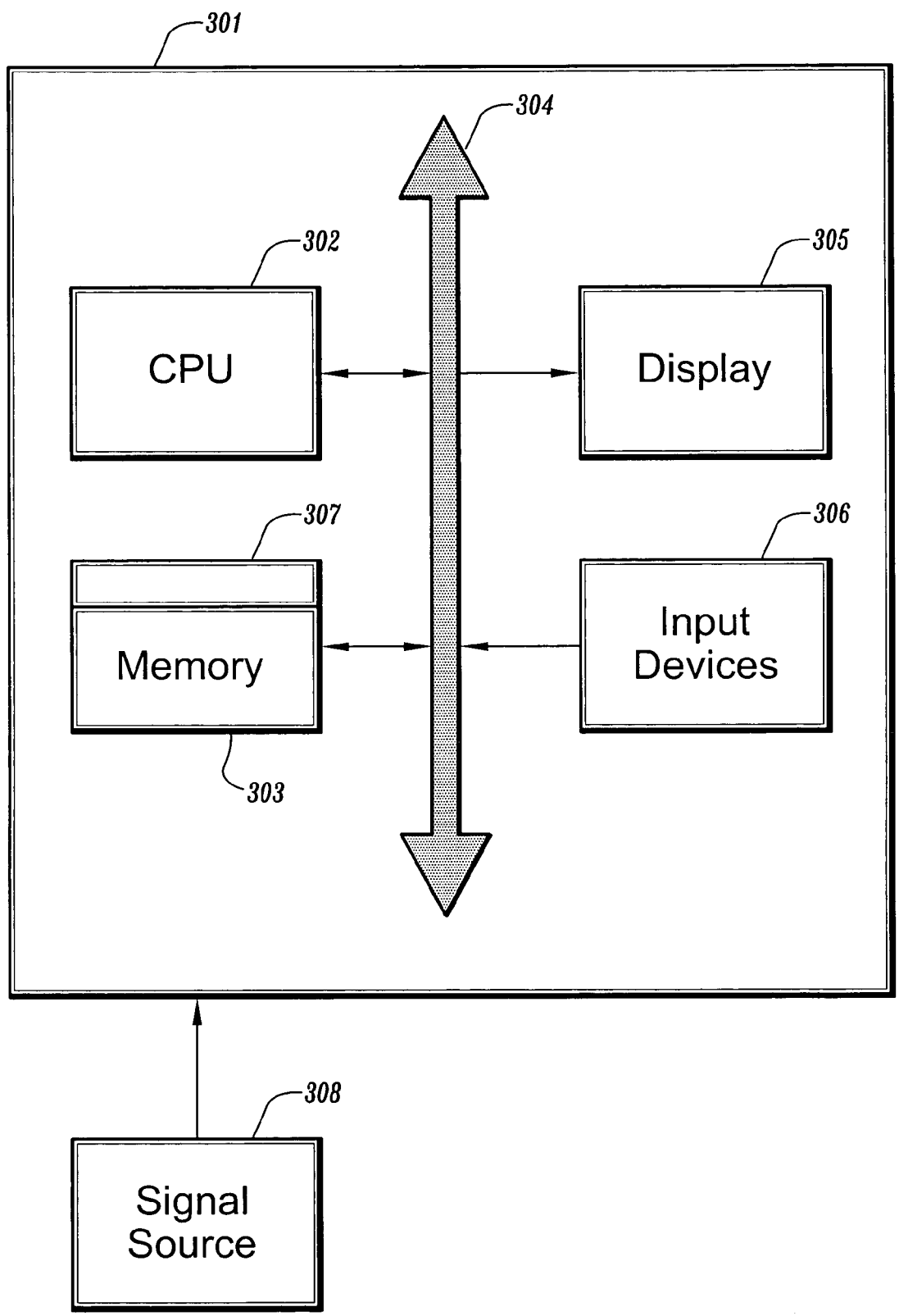
FIG. 15 shows an exemplary computer system used to implement an exemplary embodiment of the invention.

FIG. 15 shows an exemplary computer system used to implement an exemplary embodiment of the invention. According to an exemplary embodiment of the present invention, a computer system 301 for implementing the invention can comprise, inter alia, a central processing unit (CPU) 302, a memory 303 and an input/output (I/O) interface 304. The computer system 301 is generally coupled through the I/O interface 304 to a display 305 and various input devices 306 such as a mouse and keyboard. The support circuits can include circuits such as cache, power supplies, clock circuits, and a communications bus. The memory 303 can include random access memory (RAM), read only memory (ROM), disk drive, tape drive, etc., or a combination thereof. An exemplary embodiment of the invention can be implemented as a routine 307 that is stored in memory 303 and executed by the CPU 302 to process the signal from the signal source 308. As such, the computer system 301 is a general purpose computer system that becomes a specific purpose computer system when executing the routine 307 of the present invention in an exemplary embodiment of the invention.

The computer platform 301 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed in an exemplary embodiment of the invention. Given the teachings of the present invention provided herein, one of ordinary skill in the related art will be able to contemplate these and similar implementations or configurations of the present invention.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method for processing images to determine image characteristics, the method comprising:
    segmenting one or more first images to create one or more segmentation contours corresponding to the first images;
    registering the segmented first images to one or more second images, wherein the first images and the second images have substantially the same position and phase;
    transferring the segmentation contours from the first images to second images; and
    fitting the transferred segmentation contours in the second images,
    wherein the first images comprise one or more Cine MR (Magnetic Resonance) images and the second images comprise one or more DEMR (Delayed Enhancement Magnetic Resonance) viability images, and wherein the step of registering comprises registering one or more Cine MR images surrounding the viability image to create at least one deformation field, and interpolating at least one of the segmentation contours to a phase of the viability image using the deformation field to create a prior model.

2. The method of claim 1, wherein the Cine MR images further comprise:
    one or more corresponding cine images that are nearby in phase-time with respect to the predetermined position of the viability image in the Cine MR images.

3. The method of claim 2, wherein the step of transferring comprises:
    localizing one or more candidates in a given one of the viability images by registering one or more of the corresponding cine images to the given one of the viability images.

4. The method of claim 1, wherein the step of fitting further comprises:
    creating one or more energy field images to fit the prior model to a given one of the viability images; and
    fitting the prior model to the energy field images that include one or more energy fields.

5. The method of claim 4, wherein the energy fields comprise at least one of inner contour energy, outer contour energy and bloodpoolness energy.

6. The method of claim 5, wherein the step of fitting the prior model comprises:
    using one or more affine transformations to fit the prior model.

7. The method of claim 6, wherein the affine transformations comprise at least one of scaling, shearing and translation.

8. The method of claim 5, wherein the step of fitting the prior model comprises:
    using a free-form deformation for fitting the prior model.

9. A method for processing one or more Cine MR (Magnetic Resonance) images that include one or more corresponding cine images and at least one Delayed Enhancement Magnetic Resonance (DEMR) viability image to analyze a candidate, the method comprising:
    segmenting the Cine MR images to create one or more segmentation contours;
    deforming the segmentation contour such that it is interpolated to appear as it would for a phase corresponding to the viability image's phase to generate a prior model;
    localizing the candidate in the viability image by registering the corresponding cine images to the viability image;
    creating one or more energy fields image to fit the prior model to the viability image;
    fitting the prior model to the energy field images using one or more transformations; and
    classifying the candidate using a classifier in the processed viability images that include the fitted prior model.

10. The method of claim 9, further comprises:
    sorting the viability image with respect to phase-time in the Cine MR images to determine the viability image's location within the Cine MR images.

11. The method of claim 9, wherein the transformation for fitting the prior model to the energy field images is an affine transformation that comprises at least one of scaling, shearing and translation operation.

12. The method of claim 9, wherein the Cine MR images and DEMR images are images from a heart organ and the candidate is a left ventricle of the heart organ.

13. The method of claim 9, further comprises:
determining limits to a scaling of the prior model by registering at least one image slice adjacent to the corresponding cine images.

14. The method of claim 9, wherein the classifier to classify the candidate comprises a support vector machine.

15. The method of claim 9, wherein the classifier to classify the candidate comprises a threshold function.

16. A program storage device readable by machine, tangibly embodying a program of instructions executable by the machine to perform method steps for image processing to determine image characteristics, the method steps comprising:
segmenting one or more first images to create one or more segmentation contours corresponding to the first images;
registering the segmented first images to one or more second images, wherein the first images and the second images have substantially the same position and phase;
transferring the segmentation contours from the first images to second images; and
fitting the transferred segmentation contours in the second images,
wherein the first images comprise one or more Cine MR (Magnetic Resonance) images and the second images comprise one or more DEMR (Delayed Enhancement Magnetic Resonance) viability images, and wherein the step of registering comprises instructions for registering one or more Cine MR images surrounding the viability image to create at least one deformation field, wherein the viability image has a predetermined position corresponding to a location within the Cine MR images; and intepolating at least one of the segmentation contours to the viability images using the deformation field to create a prior model.

17. The device of claim 16, further comprising:
one or more corresponding cine images that are previous in phase-time in relation to the predetermined position of the viability image in the Cine MR images.

18. The device of claim 17, wherein the step of transferring comprises instructions for:
localizing one or more candidates in a given one of the viability images by registering one or more of the corresponding cine images to the given one of the viability images.

19. The device of claim 17, wherein the step of fitting further comprises instructions for:
creating one or more energy field images to fit the prior model to a given one of the viability images; and
fitting the prior model to the energy field images include one or more energy fields.

20. The device of claim 19, wherein the energy fields comprise at least one of inner contour energy, outer contour energy and bloodpoolness energy.

21. The device of claim 19, wherein the step of fitting the prior model comprises instructions for:
using one or more affine transformations to fit the prior model.

22. The device of claim 21, wherein the affine transformations comprise at least one of scaling, shearing and translation.

23. The device of claim 19, wherein the step of fitting the prior model comprises:
using free-form deformation for fitting the prior model.

* * * * *